Patented Mar. 9, 1937

2,072,903

UNITED STATES PATENT OFFICE 2,072,903

TREATMENT OF MILK PRODUCTS

Herbert E. Otting, Westerville, and Edwin H. Browne, Columbus, Ohio, assignors to M. & R. Dietetic Laboratories, Inc., a corporation of Ohio No Drawing. Application January 9, 1933, Serial No. 650,886

13 Claims. (Cl. 99—60)

The present invention relates to improvements in methods for treating or preparing milk products, more particularly to alter the balance of their constituents, such as their calcium and phosphate ion proportions and to secure other improvements therein from the dietary standpoint. It is also directed to the improvement of the means and operations wherein the desired changes in the constituents of the milk products are secured.

In Patent No. 1,954,769 of John F. Lyman, it has been shown that the removal of phosphate ions and also of calcium ions from liquid milk products may be effected under certain conditions by the use of various base exchange silicates; and in the prior application of one of us, Serial No. 560,242, filed August 29, 1931, it has also been shown that by the use of properly activated, absorptive silicas, similar results may be secured by operating under proper conditions. In the following description of the present invention, the active materials of the applications hereinbefore referred to, and which, under the conditions set forth, are capable of removing both phosphate and calcium ions from liquid milk products, are designated as exchange silicates.

In effecting the removal of the phosphate and calcium ions from liquid milk products by the methods described in the applications above referred to, we have found that by the improvements herein set forth, an improved effectiveness of removal of such constituents can be secured, based upon the original quantity of active exchange silicates employed; the loss of the active exchange material on revivification may be decreased and an improved balance of the remaining constituents in the liquid milk product, from the dietary standpoint, can be secured. We are able to secure these results by an improved treatment or regeneration of the active exchange material after use and a proper correlation of the condition of the liquid milk product in connection therewith.

In the commercial practice of the process, wherein repeated use of the active exchange material is necessary to secure economical and efficient operation, it has been noted that, as the use of the active material is repeated, its effectiveness in removing phosphate and calcium ions tends to decrease, and in varying proportions. In general, the effectiveness in removing calcium ions appears to decrease more rapidly, at least during the earlier stages of the period of decreasing effectiveness of the active exchange material.

While in general, and particularly during the earlier stages of use of a given batch of the active exchange material, regenerative treatment with alkali alone and with salt solution may be effective in restoring active exchange capacity to the material, it is found that as increasing strengths of alkali are employed and the effectiveness of the active material begins to decrease, the desired improvement in activity is not necessarily secured, and in addition, undesirable changes in the active material may take place, with loss of various constituents thereof, such as alumina or silica or both, and at times, ultimate softening and destruction of the material takes place. On the other hand, if special means are not taken to avoid these difficulties, in the use, revivification, and reuse of the material, the particles of the active exchange material may actually increase in size, apparently become encrusted with various materials, such as calcium compounds, and gradually lose their effectiveness with regard to calcium and phosphate ion removal, in different relative degrees.

As pointed out in the prior applications of Lyman and Otting hereinbefore referred to, in the exchange operation, the milk is employed in an acid condition and is subjected to treatment with the active exchange material, in the activation or regeneration of which an alkali solution is employed. As also pointed out therein, the active exchange material may be natural or artificial zeolitic materials, such as zeolites, glauconite, the materials commonly known in the trade as "Permutit", "Refinite", "Crystalite" and the like; and a specially treated and activated silica gel may likewise be employed as the active exchange material.

In accordance with the present invention, after each treatment of the liquid milk product with the active exchange material and before reuse, it is subjected to treatment with a modified alkaline solution and also with a salt solution, likewise modified as hereinafter pointed out. The exchange material, after being employed in the treatment of the liquid milk product, and after suitable washing, is treated with an aqueous alkali solution containing a proportion of alkali, such as sodium hydroxide varying from 3 to 20 parts per 1000, to which has been added a small proportion of boric acid, the amount thereof being from one-fourth to about three-fourths the proportion of the sodium hydroxide. A suitable solution contains about 4 parts of boric acid and 6 parts of sodium hydroxide (76% $Na_2O$) per 1000 parts by weight. This solution has a pH of approximately 13 and 1 cc. will neutralize 1.2 ccs. of $$\frac{N}{10}$$

hydrochloric acid. The solution is contacted with the washed, spent exchange material for a sufficient period, say 5 to 15 minutes and usually about 10 minutes either with agitation of the exchange material or in case the latter is present in a bed, the solution may be recirculated through the bed for the desired period. The alkalinity of the solution is substantially reduced in the process; thus, in a typical example, the pH may be reduced to about 11 and the alkalinity to a point such that 1 cc. of the solution is the equivalent of 0.25 cc. of $$\frac{N}{10}$$

hydrochloric acid. The solution is then withdrawn, the exchange material washed, and treated with a suitable salt solution.

In the alkaline solution employed in accordance with the present invention, as above described, borax may be employed in place of the boric acid. In addition, other mildly alkaline salts of strong alkalies and weak acids, such as sodium acetate, sodium citrate or the like may be employed in place of the boric acid or borax, or the corresponding acids may be added, a slight additional quantity of alkali being supplied in the solution to compensate for the use of the acid in place of the salt. Use of such weak acids or alkaline metal salts thereof in the alkali solution not only improves the activity of the base exchange material in subsequently effecting removal of phosphate ions from the liquid milk product subjected to treatment, but also greatly aids in preventing deterioration of the active exchange material, prevents its softening to a gel-like structure and decreases the losses of alumina and silica.

As indicated in the prior applications above referred to, the salt solution employed may be the usual alkali metal salt used in revivifying basic exchange silicates, more particularly alkali metal halides or chlorides. For example, an aqueous solution of NaCl containing from up to 1½ to 2 lbs. salt per gallon may be used. However, in general, we have found it preferable to use more dilute salt solutions; for example, solutions containing 10 to 30 parts of salt per 1000. Furthermore, we have found that the continued use of the salt of a single alkali metal in revivifying the active exchange material ultimately tends to cause disturbances in the alkali metal salt relationships of the milk subjected to treatment. We therefore prefer to employ a solution containing equal parts of salts of sodium and potassium; for example, one containing approximately 10 parts of sodium chloride and 10 parts of potassium chloride per 1000 parts by weight. The relative proportions of the two salts in the revivifying solution may be varied somewhat, particularly if it is found that the desired balance of sodium and potassium salts in the liquid milk product undergoing treatment is being disturbed; and in the event that a decrease in either the sodium or potassium content of the product is taking place, a corresponding increase in the relative proportion of the salt of the same alkali metal may be made in the solution employed for revivification.

We have found that to effectively maintain the activity of the exchange material in removing phosphate ions in the desired relation to the removal of calcium ions from the liquid milk product, a further revivifying step should be employed, at least occasionally. This revivifying step is employed periodically after washing the spent exchange material with water and before the treatment with the alkali solution. In general this is done every other or every third revivifying operation, although at times it may be advisable to employ it regularly. By the additional revivifying step thus employed, we are enabled to secure an improved, continued effectiveness of removal of phosphate ions from the liquid milk products under treatment.

The alkaline solution and the salt solution may be applied in reverse order, but in general, it is preferred to employ the alkaline solution prior to the salt solution, as hereinbefore set forth.

In the additional revivifying step, we employ, after the preliminary washing of the exchange material, a dilute acid solution, suitably of acetic acid, containing a small proportion of a salt, suitably an alkali metal salt such as potassium or ammonium, chloride or preferably sodium chloride. Such a solution may contain from 3 to 10 parts of glacial acetic acid and from 5 to 25 or 30 parts of sodium chloride or other suitable salt per 1000 parts by weight, in aqueous solution. In addition, a small proportion of a salt of a strongly alkaline base and a weak acid, such as sodium acetate, sodium borate, sodium citrate, or the like may be employed in the proportion of 1 to 5 or more parts per 1000 of the solution. Thus a suitable solution for the purpose may be made up in the proportion of 6.2 parts by weight of acetic acid, 20 parts by weight of sodium chloride and 4 parts by weight of sodium acetate per 1000, the solution having a pH of about 4 and being of such an acidity that 1 cc. equals approximately 1 cc. of $$\frac{N}{10}$$

sodium hydroxide. This solution is contacted with the washed spent exchange material either by agitating the latter in the presence of the solution or by recirculating the solution either upward or downward through a bed of the exchange material. The contact is continued until the desired effect is assured, say from 10 to 20 minutes. After contact, the acidity of the solution is found to be reduced to about one-third and the pH raised to about 5.2. In continuing the revivifying operation, the exchange material, after washing with water, is washed with the alkali solution and with the salt solution as previously described. However, when the initial acid wash of the spent exchange material is employed, it is desirable to employ a somewhat stronger alkali solution in the following alkali wash. In such case, the alkali strength of the alkali washing solution may be increased say to 5 to 15 parts per 1000 by weight of sodium hydroxide, the proportions of boric acid, borax or equivalent material included remaining the same. Following the revivification treatment, and washing, the active exchange material is contacted with the liquid milk product to be treated. As pointed out in the prior application and patent of Lyman and Otting above referred to, the milk must be in an acid condition during the contacting operation in order to secure effective removal of the phosphate anions.

We find it desirable to employ the weaker, organic food acids to produce the desired acidity of the milk, for example, the hydroxylated food acids such as lactic acid and citric acid. In general, we prefer to employ citric acid for the purpose, as the desired acidity may be secured without deleterious effect upon the milk, the temperature of the milk product can be raised to a point at which ionization of calcium is secured without injurious action, and the citric acid itself is innocuous and improves the character of the final product from the standpoint of the alkaline ash secured. The proportion of citric acid employed may be varied in order to secure the desired effect in the removal of the phosphate ion, and may be for example, from 0.20% or lower to 0.45% or higher (calculated as lactic acid). As pointed out in the prior application of Lyman, above referred to, variations in the acidity of the milk product affect the extent of removal of the calcium and phosphate ions. The acidified milk is then subjected to treatment with the activated exchange material in general as set forth in the prior applications above referred to.

For example, a liquid milk product having initially a calcium content of 0.1350% and a phosphorus content of 0.1050% is acidified with citric acid to an acidity of 0.35% (as lactic acid) while at a temperature of 55° F. As the material acidified with citric acid is reduced in its sensitiveness to heat, it may then be heated to 65° F. for improved ionization of calcium and the milk product then contacted with the active exchange material, which has previously been activated by treatment with alkali or by a revivifying and regenerating process such as hereinbefore described. When the regenerative process as described has been employed, it has been found that an adequate removal of calcium and phosphorus may be secured in a single passage of the milk, the flow of the milk being either upwardly or downwardly. The time of flow is so controlled that on leaving the contact material, the acidity of the milk product ranges from 0.12 to 0.20% (as lactic acid); the calcium content has been reduced to about 0.0950% and the phosphorus content has been reduced to about 0.0650%. The milk thus treated and with its calcium and phosphate ion ratios reduced, is found not to curdle with rennin, even when employing 10 drops of concentrated rennin extract to 10 cc. of milk product. Furthermore, the treated milk does not curdle with pepsin, even with the addition of 1 cc. of a 0.6% of scale pepsin (1 to 3000), acidified with hydrochloric acid to approximately 0.4%, to 10 cc. of the treated milk. Its potassium and sodium balance is substantially as in the original milk.

The use of the citric acid in acidifying the milk prior to treatment with the active exchange material reduces the sensitivity of the product to the action of heat and of enzymes, such as rennin or pepsin. Furthermore, it imparts an increased alkalinity to the ash and is effective in overcoming acidosis in the diet of an infant to which the treated product is fed. For example, the products resulting from the treatments above set forth has an ash with an alkalinity of about 0.3%. If in a similar treatment, hydrochloric acid is employed to acidify the milk product, the ash of the treated milk has an alkalinity of about 0.12% and if lactic acid is used, its alkalinity is about 0.2. The improvement with lactic acid and especially with citric acid is evident.

We have found that the condition of the active exchange material, as determined by the revivifying and regenerating treatment above described, is closely related to the effects secured on treatment of the liquid milk product with the exchange material. Thus, by operating in accordance with the present invention, we are enabled to secure an adequate removal of calcium and phosphate ions in a single passage of the liquid milk product through a bed or contact mass of the exchange material. Furthermore, we are enabled to control the character of the constituents retained in the milk, preserving a better balance of the sodium and potassium salts, and in general secure a more dependable operation and an improved treated product.

The liquid milk products undergoing treatment may be whole milk, skim milk, or other liquid milk products, such as buttermilk, whey, or the like.

Although the present invention has been described in connection with specific details of various operations in which it is carried out, it is to be understood that it is not limited thereto, except in so far as included in the accompanying claims.

We claim:

1. The method of treating liquid milk products to secure an improved food product low in ionized calcium and phosphate ions which comprises adding citric acid to the liquid milk product to obtain an acid condition therein, and contacting the acidulated milk with an active exchange silicate material.

2. In the method of treating liquid milk products to reduce their calcium and phosphate ion content and secure an improved food product, adding to the liquid milk product to be treated a small proportion of citric acid to secure an acid condition in the milk, and subsequently contacting active alkali-metal carrying exchange silicate material with the acidulated milk.

3. In the method of treating whole milk to reduce its calcium and phosphate ion content and secure an improved food product, adding to the milk to be treated a small proportion of citric acid to secure an acidity in the milk equivalent to 0.20 to 0.45% (calculated as lactic acid), and subsequently contacting the activated exchange silicate material with the acidulated milk.

4. The method of effecting removal of phosphate ions from liquid milk products and maintaining a normal balance of sodium and potassium salts therein which comprises preliminarily activating an exchange silicate material by contacting it with an aqueous alkaline solution and with a salt solution containing sodium and potassium salts thereby providing removably bonded potassium and sodium ions in said exchange material, and subsequently contacting the treated exchange silicate material with the liquid milk product while maintaining the latter in the acid state, thereby securing a treated product containing sodium and potassium ions in desired proportion.

5. The method of preparing a milk product for food purposes which comprises acidifying a liquid milk product by adding thereto a small proportion of citric acid, preliminarily treating an exchange silicate material with a solution of alkali and a solution containing sodium and potassium chlorides in controlled proportions, thereby providing removably bonded potassium and sodium ions in said exchange material, and subsequently contacting the active exchange silicate material with the acid milk, whereby a product is obtained having a normal balance of sodium and potassium 6. The cyclic method of operation to effect removal of calcium and phosphate ions from liquid milk products which comprises contacting an acid liquid milk product with an active exchange silicate material, separating the spent exchange material, subjecting it to the action of a solution of alkali containing an alkali metal salt of a weak acid and to a salt solution containing sodium and potassium salts, and subsequently contacting the reactivated exchange silicate material with additional liquid milk products in acid state.

7. The cyclic method of operation to effect removal of calcium and phosphate ions from liquid milk products which comprises contacting an acid liquid milk product with an active exchange silicate material, separating the spent exchange material, subjecting it to the action of a solution of alkali containing an alkali metal salt of boric acid and to a salt solution containing sodium and potassium salts, and subsequently contacting the reactivated exchange silicate material with additional liquid milk products in acid state.

8. The cyclic method of operation to effect removal of calcium and phosphate ions from liquid milk products which comprises contacting an acid liquid milk product with an active exchange silicate material, separating the spent exchange material, subjecting it to the action of a solution of alkali containing an alkali metal salt of a weak acid and to a solution of sodium and potassium chlorides, and subsequently contacting the reactivated exchange silicate material with additional liquid milk products in acid state.

9. The cyclic method of operation to effect removal of calcium and phosphate ions from aqueous solutions containing the same which comprises contacting such solutions in acid state with an active exchange silicate material carrying adsorbed calcium and phosphate ions, separating the spent exchange material, subjecting it to the action of a solution of alkali containing an alkali metal salt of a weak acid and to a salt solution containing sodium and potassium salts, and subsequently contacting the reactivated exchange silicate material with additional acid aqueous solution containing calcium and phosphate ions to remove calcium and phosphate ions therefrom and supply sodium and potassium ions thereto.

10. The cyclic method of operation to effect removal of calcium and phosphate ions from aqueous solutions containing the same which comprises contacting such solutions in acid state with an active exchange silicate material, separating the spent exchange material carrying adsorbed calcium and phosphate ions, subjecting it to the action of a solution of alkali containing an alkali metal salt of a weak acid and to a solution containing sodium and potassium chlorides, and subsequently contacting the reactivated exchange silicate material with additional acid aqueous solution containing calcium and phosphate ions to remove calcium and phosphate ions therefrom and to supply sodium and potassium ions thereto.

11. The cyclic method of operation to effect removal of calcium and phosphate ions from aqueous solutions containing same which comprises contacting such solution in acid state with an active exchange silicate material, separating the spent exchange material carrying adsorbed calcium and phosphate ions, subjecting the spent exchange material to the action of a solution of an acid containing a salt then to the action of a solution of alkali containing an alkali metal salt of weak acid and to a salt solution containing sodium and potassium salts and subsequently contacting the reactivated exchange silicate material with additional acid aqueous solution containing calcium and phosphate ions to remove calcium and phosphate ions therefrom and to supply sodium and potassium ions thereto.

12. The method of preparing a milk product for food purposes which comprises acidifying a liquid milk product and contacting the acidified liquid milk product with an active exchange silicate material carrying removable potassium and sodium ions in controlled proportions, whereby a milk product is obtained having reduced calcium and phosphate ion content and with a controlled balance of sodium and potassium salts.

13. The method of preparing a milk product for food purposes which comprises acidifying a liquid milk product by adding thereto a small proportion of citric acid, and contacting the acidified liquid milk product with an active exchange silicate material carrying removable sodium and potassium ions in controlled proportions, whereby a product is obtained of reduced calcium and phosphate ion content with a high alkaline ash and having a controlled proportion of sodium and potassium salts.

HERBERT E. OTTING.
EDWIN H. BROWNE.